United States Patent [19]

Thibonnet

[11] Patent Number: 4,534,408

[45] Date of Patent: Aug. 13, 1985

[54] INDUCTION DEVICE FITTED INSIDE A TANK FOR DRAWING IN FLUIDS SUCH AS LIQUID FUELS

[75] Inventor: Bernard Thibonnet, 1, Allée de la Vigie, Carry le Rouet, France, 13620

[73] Assignees: Bernard Thibonnet, Carry le Rouet, France; Philippe H. Staib, Bangkok, Thailand; Jean-Michel Babet, Paris, France

[21] Appl. No.: 458,746

[22] Filed: Jan. 18, 1983

[30] Foreign Application Priority Data

Jan. 25, 1982 [FR] France .................................. 82 01114

[51] Int. Cl.³ .................................................. F28F 9/00
[52] U.S. Cl. ...................................... 165/108; 123/514; 123/557; 165/132; 165/139
[58] Field of Search ................ 123/544, 548, 549, 557, 123/514, 516, 518; 165/132, 139, 108

[56] References Cited

U.S. PATENT DOCUMENTS

| | | | |
|---|---|---|---|
| 1,908,932 | 5/1933 | Tiburtius | 165/132 X |
| 2,599,699 | 6/1952 | Dilworth et al. | 123/514 X |
| 3,768,454 | 10/1973 | Markland | 123/557 X |
| 3,768,730 | 10/1973 | Campbell | 123/557 X |
| 4,279,232 | 7/1981 | Schuster et al. | 123/514 X |
| 4,286,551 | 9/1981 | Blitz | 123/557 X |
| 4,320,734 | 3/1982 | Balachandran | 123/516 X |
| 4,326,492 | 4/1982 | Leibrand, Sr. et al. | 123/514 X |
| 4,343,283 | 8/1982 | Shepherd | 123/557 |

*Primary Examiner*—Sheldon J. Richter
*Attorney, Agent, or Firm*—Arthur B. Colvin

[57] ABSTRACT

Induction device fitted inside a tank for drawing in fluids such as liquid fuels.

Said device comprises an enclosure resting on a tray, said enclosure being provided at its base with vertical directional slots communicating with the tank, and at its upper part with a member adapted to connect the enclosure with the tank, and said enclosure containing, on the one hand, an induction pipe with an end portion which is bent towards the upper part of the enclosure and comprising a series of orifices distributed over its length, and on the other hand, a fluid return pipe ensuring the warming up of the enclosure.

The invention is used to help drawing certain fuels into a tank.

10 Claims, 12 Drawing Figures

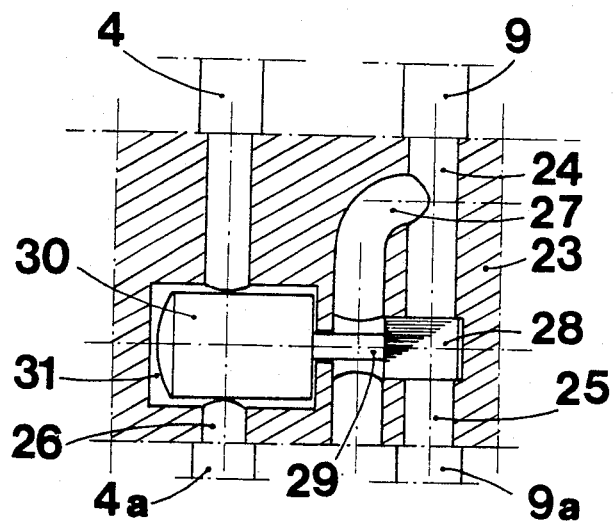
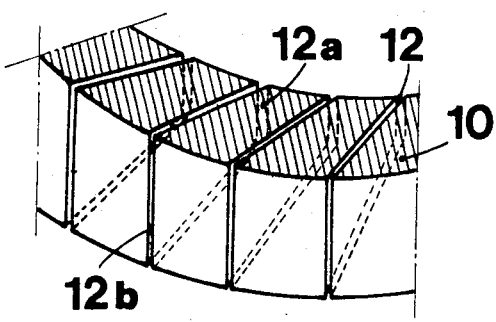
fig 5  fig 4
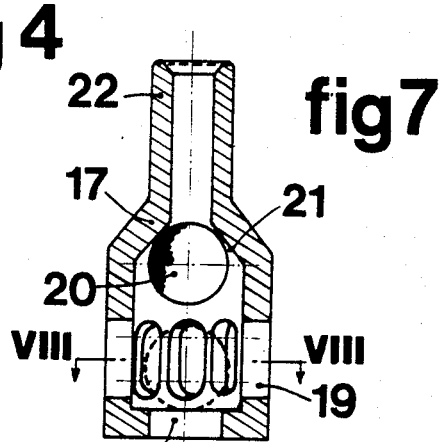
fig 7
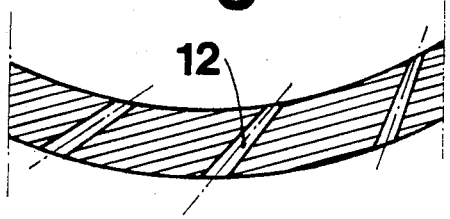
fig 6
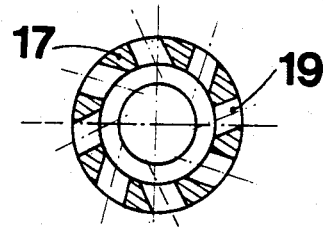
fig 8

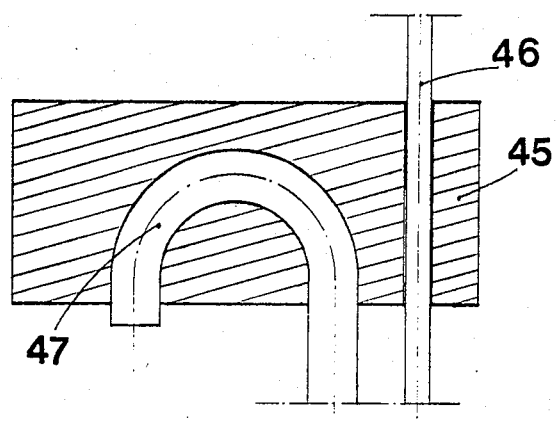
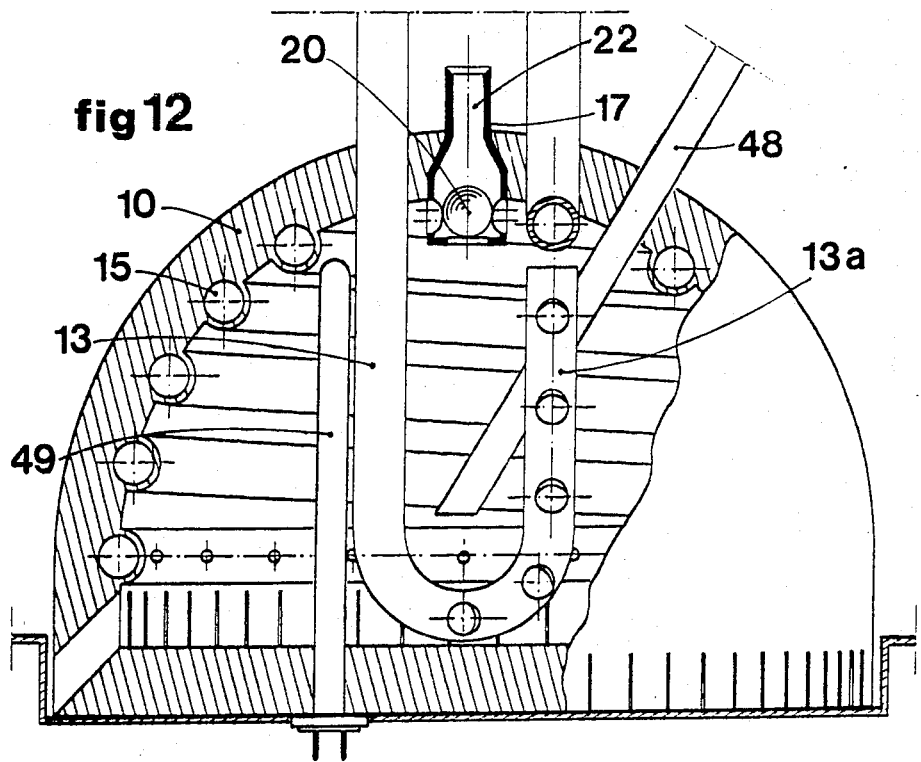

INDUCTION DEVICE FITTED INSIDE A TANK FOR DRAWING IN FLUIDS SUCH AS LIQUID FUELS

The present invention relates to a device fitted inside a tank for pumping liquid fuels, especially when the physical characteristics of said fuels are altered in winter after a prolonged exposure to the cold.

Said device further permits to warm up the fluids and to suspend any heavy particles or water contained therein.

The currently known methods use pipes, with or without filters, which pipes are immersed directly into the liquid mass; these methods, however, do not implicate a controlled warming up or mixing of the fluid. Great difficulties arise, as a result, where pumping is concerned, especially due to the heavy particles settling at the bottom of the tank, such as precipitations of paraffin crystals and accumulation of water.

Various types of heaters have been proposed such as fuel circulation heaters, but all of them require outside sources of heat involving high energy consumptions. Moreover, these known devices present disadvantages, the most serious one being the impossibility to pump cold liquid fuels into the tanks, if these tanks have not been heated through.

In general, all these equipments are expensive and relatively difficult to adapt on the existing tanks, and they do not really meet the requirements arising from the deterioration of the physico-chemical characteristics of liquid fuels.

And in many cases, industrialists have had to use chemical products to improve the pumping conditions of liquid fuels. These additives, despite their efficiency, do not prevent fractionated heavy particles of paraffin from depositing on the bottom of the tank.

This greatly disturbs the pumping cycle and the filtering, the filters becoming clogged up.

It is the object of the present invention to overcome the aforesaid disadvantages by proposing a device which comprises an enclosure resting on a tray, said enclosure being provided at its base with vertical directional slots communicating with the tank, and at its upper part with a member adapted to connect the enclosure with the tank, and said enclosure containing, on the one hand, an induction pipe with an end portion which is bent towards the upper part of the enclosure and comprising a series of orifices distributed over its length, and on the other hand, a fluid return pipe ensuring the warming up of the enclosure.

The device according to the invention which is mounted in strainer fashion, immersed in the liquid fuel, works as a mass heater, as a temperature control means, as a paraffin anti-crystallizing means, as a mixer-emulsifier means, as a degasifying means, and as a tranquilizing tub. It prevents having to drain the pumps and enables to bring up the water and sediments contained in the fuel.

The heating means is constituted by a coil element, mounted inside the enclosure and provided with calibrated directional holes, designed to create a gyratory flow inside the enclosure, and thus permit the mixing up and warming up of the fluid.

The temperature control mounted on the apparatus enables to keep a constant induction temperature in the pump feeding the thermal installation.

The tray permitting the passage of the water and sediments, these are extracted by the feeding pump.

The induction pipe with the bent end is provided with orifices permitting primarily to pump up the upper parts of the enclosure, if the need arises.

The member through which the enclosure and tank communicate together is equipped with an inside float which, by contacting with its seat, ensures the tightness necessary to the good operation of the apparatus.

If the level of the liquid in the enclosure goes down the displacement of the ball valve enables to fill up the enclosure from the top.

The disadvantages mentioned hereinabove, which are linked to the use of liquid fuels, have been overcome with devices mounted either on the tank circuits, or in the filters, these devices working with electricity, water or hot air.

The device according to the invention enables to replace these known devices by using all the heat contained in the flow containing any excess fluid discharged from the pumps and any leaked out fluid, returning to the tank. The small and compact, simple and inexpensive device according to the invention is mounted in strainer fashion on a pipe system connected to the feeding pump. Said device enables to pump up most of the currently known fuels in improved conditions of pumping, temperature control and energy saving, without using an external source of energy such as: hot water, hot air or electricity.

The invention will be more readily understood on reading the following description with reference to the accompanying drawings, in which:

FIG. 4 is a cross-sectional view on a large scale of the regulator;

FIG. 5 is a perspective view of one embodiment of the slots situated at the base of the enclosure;

FIG. 6 is a horizontal sectional view through the portion of the apparatus illustrated in FIG. 5.

FIG. 7 is an axial cross-section of the member used for connecting up the tank and the enclosure;

FIG. 8 is a cross-sectional view along line VIII—VIII of FIG. 7;

FIG. 10 is an axial section of another embodiment of the device wherein the induction pipe is equipped with a ball valve;

FIG. 12 is a cross-sectional view of another embodiment of the induction device according to the invention.

Figure 1:
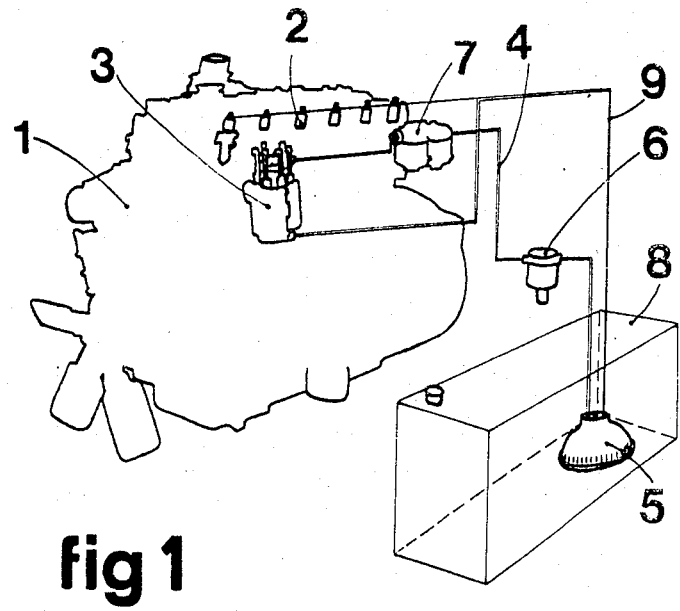
FIG. 1 is a perspective view of an internal combustion engine and of its fuel tank inside which is fitted the fluid induction pipe according to the invention.

FIG. 1 shows an internal combustion engine in which the injectors 2 are fed from an injection pump 3 connected via a conduit 4 to the fuel induction device 5 according to the invention. A feeding pump 6 and filters 7 are mounted in known manner on the conduit 4.

The induction device 5 which is mounted in strainer fashion, immersed in the fuel tank 8, is connected via another conduit 9 with the flow containing the excess fluid discharged from the injection pump and the fluid leaked out of the injectors 2.

Figure 2:
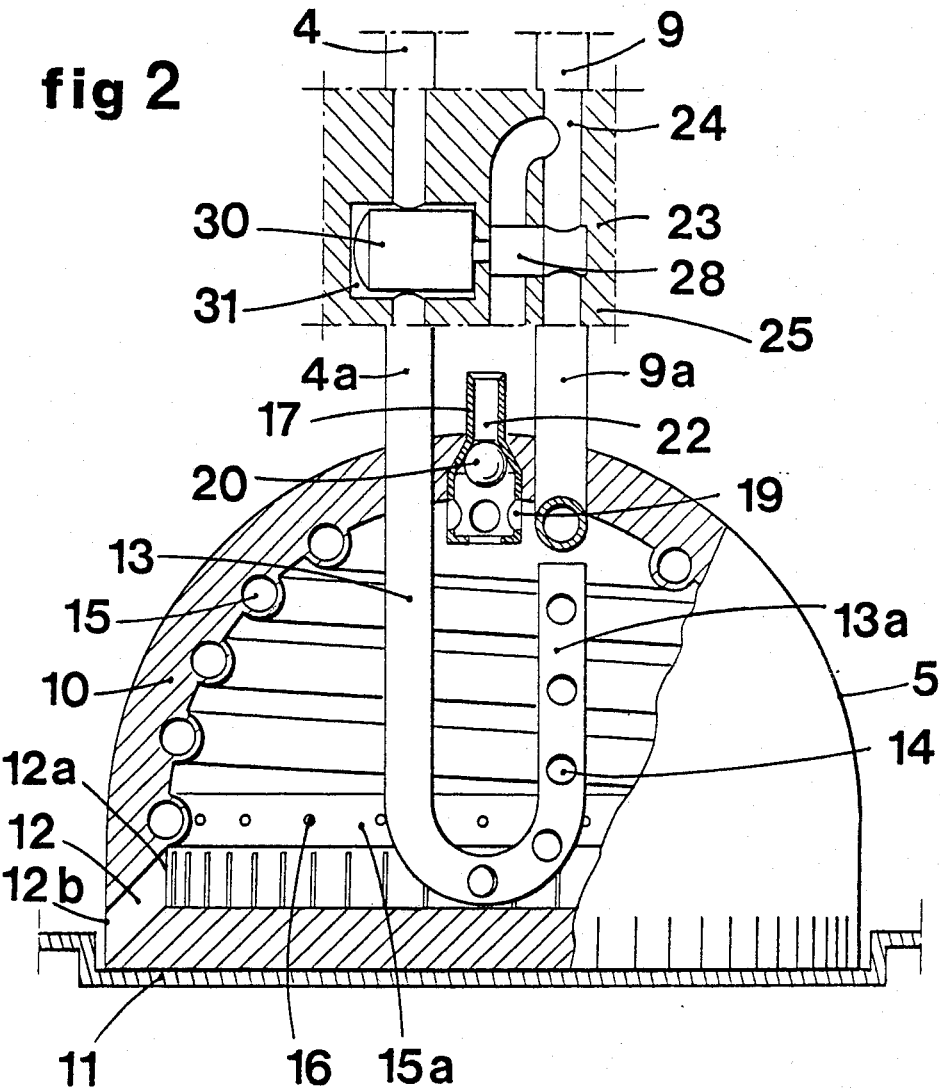
FIG. 2 is an elevational view of a longitudinal section of the fluid suction device according to the invention.

The fluid induction device 5 according to the invention illustrated in FIG. 2 comprises an enclosure 10 which is bell-shaped, closed at its lower part by a wall and rests on a tray 11 provided at the bottom of the tank 8 or built-on to the bottom of said tank.

The walls of said enclosure 10 are constituted by a heat-insulating material and the said enclosure can be fitted internally with blades. Said enclosure 10 is provided at its lower part and on its periphery with vertically arranged and tangentially oriented directional slots 12 (FIGS. 2, 5 and 6), the said slots 12 creating a communication between the tank 8 and the inside of the enclosure 10 and having orifices 12a issuing into said enclosure, which orifices are situated on a higher level than the orifices 12b issuing into the tank.

Figure 3:
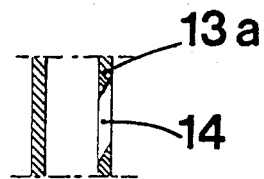
FIG. 3 is a cross-sectional view of the induction pipe.

An end part 13 of the liquid fuel induction pipe 4 is situated inside the enclosure, the said end part being U-shaped and the end branch 13a of the U-shape being bent towards the upper part of the enclosure. Said end branch 13a comprises a series of orifices 14, distributed throughout its length and the axis of which points downwardly (FIG. 3) in order to collect the liquid from as high as possible.

Against the walls of the enclosure, and inside it, is placed a coil element 15 which ensures the warming-up of the enclosure 10, which coil element is connected to the pipe 9 returning the warm fluid coming from the injection pump 3 and the injectors 2.

A series of calibrated directional holes 16 are provided at the base 15a of the coil element, which holes create a gyratory flow of fluid inside and outside the enclosure.

A member is provided at the upper part of the enclosure 10 through which said enclosure can communicate with the tank, the said member being constituted of a hollow body 7 (FIGS. 2, 7, 8) having at its lower part an orifice 18 issuing into the enclosure 10 and, on its periphery, directional slots 19 which are tangentially oriented in order to create a revolving flow inside said enclosure 10.

A spherical float 20 is freely mounted inside the hollow body 17 said float being adapted to move vertically so that, by resting against a seat 21, it can close off the aperture of a shaft 22 provided at the upper part of the hollow body and issuing into said tank 8.

Between the enclosure 10 and the feeding pump 6 is placed a heat regulator 23 (FIGS. 2 and 4) which is mounted on the induction pipe 4 and on the warm fluid return pipe 9. This regulator comprises a fuel admission pipe 24, a fuel outlet 25 directed towards the coil element 15, an exhaust pipe 26 for the fuel coming from the liquid drawing-in end portion 13 and a conduit 27 connected to the fuel admission conduit 24 and issuing into the tank 8.

A slide valve 28 connected via a rod 29 to a heat-sensitive member 30 can selectively close off the through holes provided in conduits 24 and 27. A housing 31 is provided on the passage of the conduit 26, in which housing is placed a heat-sensitive member 30.

The device according to the invention works as follows:

The enclosure 10 being immersed in the tank 8, the liquid fuel contained in the enclosure is isolated from the rest of the liquid situated in the tank when the float 20 obturates the orifice of the shaft 22.

The temperature inside the tank going down gradually as this is the case in winter when the vehicle has been parked for some time, the paraffin crystals contained in the liquid fuel tend to agglomerate at the lower part of the tank, even if they have been treated with chemical additives.

The heat inertia of the overall mass of the liquid fuel unbalancing the function of the paraffin crystals, especially in the center of the tank, and the apparatus being immersed in that privileged area, the only part which is protected from that phenomenon is the part of liquif fuel situated inside the enclosure 10, due to a difference of superficial pressure inside the liquid and to the heat-insulation of the enclosure of the apparatus. When switching on the feeding pump 6, some liquid fuel is drawn in through the conduit 4 and through the end portion 13 provided in his bent-up end portion 13a with suction orifices 14.

The crystals of paraffin being agglomerated in the lower part of the tank and obstructing the vertical directional slots 12 of the enclosure 10, the uncongealed fuel situated at the upper part of the tank penetrates into the enclosure 10 through the connecting mbmer 17, the float 21 being down.

Knowing that the return flow of excess fuel discharged from the injection pump 3 varies little in relation to the load, and is set at between 40 and 60% of the output of the feeding pump 6 with a $\Delta T$ of 25° C., the warming-up process will start within seconds from the engine being started.

The return from the tank 8 taking place through the conduit 9 connected with the coil element 15 via the conduit 9a, the warmed liquid fuel penetrates into the enclosure through the calibrated directional holes 16, by creating a gyratory movement washing and warming up the lower part of the enclosure 10 and the tray 11.

Progressively, the moving flow causes the melting of the paraffin crystals drawn in with the liquid fuel, taking the fuel into a rotating movement, speeded up by the vertical directional slots 12 placed at the base of the enclosure 10. The combination of these different flow supplies tends to cause the liquid fuel to come up to the upper part of the enclosure, thus creating great heat exchanges.

The coil element 15, by warming up all the walls of the enclosure 10 at the same time, communicates its calories to the mass of fuel which is inside the enclosure and in direct contact with its walls. When the free circulation of fuel at the lower part of the enclosure 10 enables a perfect filling up of the latter from the bottom part, the float 20 returns in a closing off position over the orifice of the shaft 22, thus preparing the next cooling cycle. As the temperature of the fuel at the entrance to the injection pump 3 must not exceed a certain value, the temperature regulator 23 operates as follows.

The warmed-up fuel arriving into the enclosure 10 and flowing into the body of the regulator 23 through the conduit 26 comes into contact with the heat-sensitive member 30. If the fuel temperature is too high, the heat-sensitive member 30 acts on the slide valve 28 which closes off the conduit 24, in order to deviate the flow of fluid coming from the conduit 9 towards the conduit 27 issuing directly into the tank 8 and thus isolating completely the enclosure 10. The fuel temperature going down inside the enclosure 10, there occurs a cooling down of the heat-sensitive member 30 which actuates the slide valve 27, allowing into the conduit 24 the fluid flowing from the conduit 9 to the conduit 9a connected with the coil element 15, this regulator can be replaced by a hand-operated three-way valves.

Figure 9:
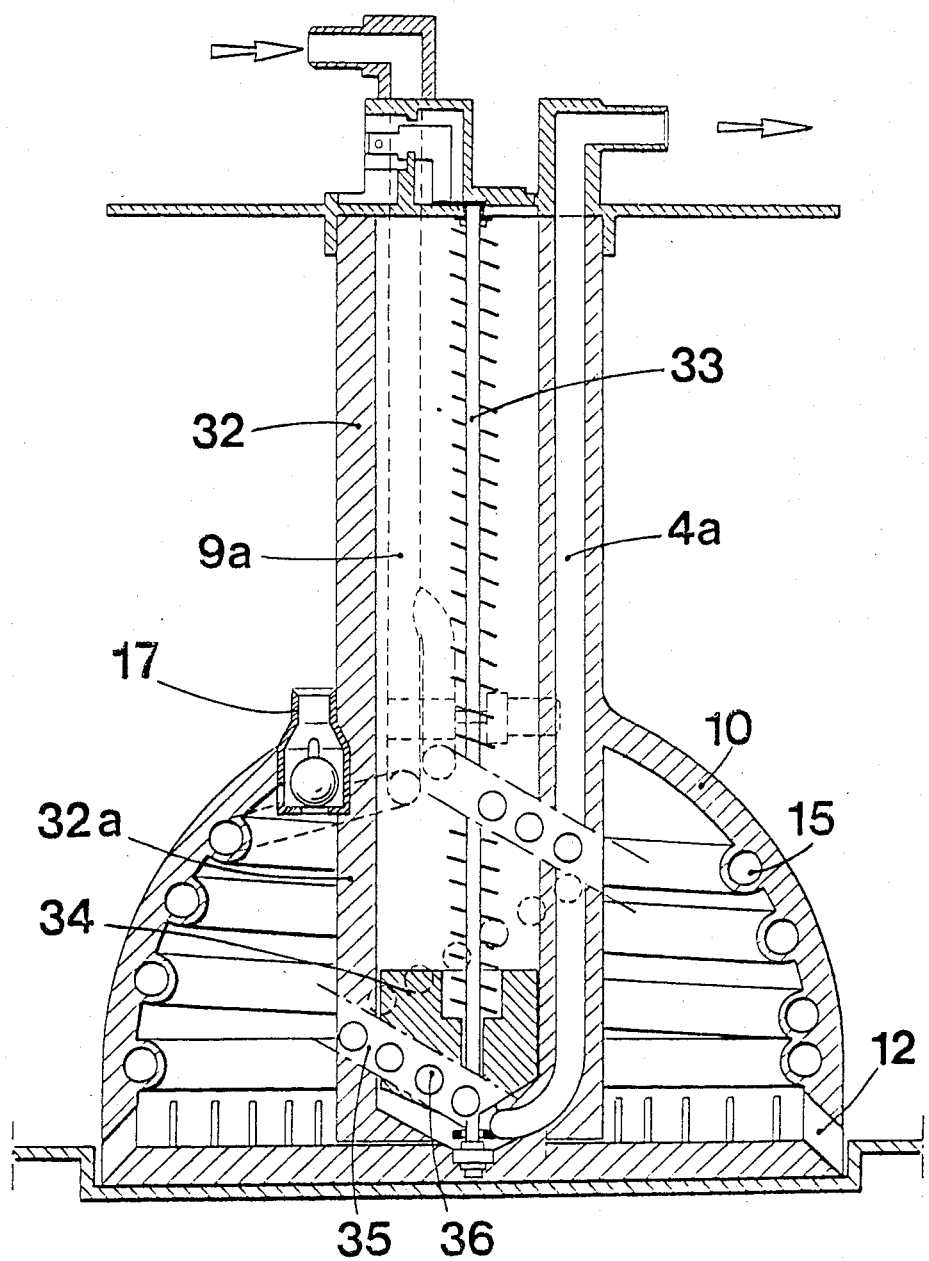
FIG. 9 is an axial section of another embodiment of the device, equipped with a liquid gauge.

FIG. 9 shows another embodiment of the fluid induction device wherein a liquid level gauge, constituted by a tubular element 32 spreading over the entire height of the tank and partly inside the enclosure 10, receives internally in known manner, a guide rod 33 on which a gauge cock 34 can move in known manner. Around the tubular part 32a of said gauge is placed a coiled induction pipe 35 connected to the conduit 4a drawing in the fluid towards the pump, the said coiled pump 35 which extends downwards from the top of the enclosure is provided with orifices 36 distributed over its length. According to this embodiment, the member 17 through which the enclosure communicates with the tank is disposed laterally.

Figure 11:
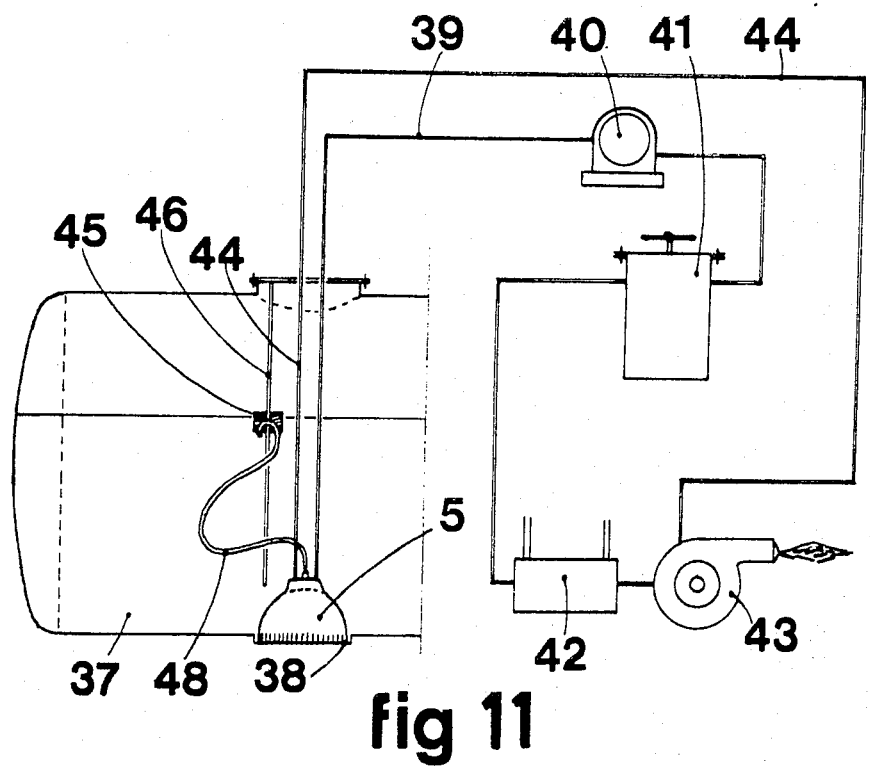
FIG. 11 is a diagrammatical view showing the device according to the invention fitted in a heating installation.

FIG. 11 shows another installation of the device 5 in the fuel supply circuit of a boiler for example, the said installation comprising a tank 37, a tray 38 being shaped into the bottom of said tank, on which tray is placed the induction device 5 which is connected up via a conduit 39 drawing in fuel to a feed pump 40, with a filter 41, a heater 42 and a burner 43. The burner 43 is also connected to the induction device 5 via an overflow return pipe 44.

The device is equipped with a float 45 guided by a vertical rod 46 (FIGS. 10, 11). Said float 45 is equipped with a cone-shaped induction pipe 47 issuing close to the surface of the liquid in the tank, the said pipe being connected via a flexible tube 48 to the shaft 22 of the member 17 through which the enclosure 10 communicates with the tank. Owing to this arrangement, it is possible to pump primarily the light fractions of fuel situated on the surface of the liquid.

In this case, it becomes unnecessary to use a heat regulator 23, the control being ensured by the heater 42. This control can nonetheless be advantageous to an industrialist wanting to regulate upstream the temperature of the drawn in fuel.

This solution offers a further advantage which is to allow a fluxing of the viscous particles contained in petroleum, products, for example by conducting a permanent mixing at the level of the strainer thereby replacing the particles and water in suspension before they are pumped in. An auxiliary stirring means can be installed to further speed up the mixing inside the enclosure.

The addition of a tube 48 on the enclosure 10 (FIG. 12) acting as a probe and connected outside the tank to a feed-regulating pump or to any other installation, enables to introduce external substances into the enclosure 10 without having to treat the whole tank. Said elements injected according to different methods, are mixed and drawn in immediately by the feeding pump.

An auxiliary exchanger 49 with heat regulation means can also be installed in the device to increase the warming-up flow, especially in the difficult cases.

In the event of an accidental accumulation of gas inside the enclosure 10, the lowering down of the float 20 would allow the immediate degasifying of the enclosure with discharge into the atmosphere through the tank air intake, thus preventing a draining of the feeding pump. An isolating valve can be fitted on the upper part of the shaft 22.

The induction device preventing by nature the displacement of the liquid inside the enclose avoids the need to use a tranquillizing tank.

The invention is in no way limited to the description given hereinabove and on the contrary covers any modifications that can be brought thereto without departing from its scope.

What is claimed is:

1. Fluid induction device for use with liquid fuel, fitted inside a tank for drawing in liquid fuels in particular, wherein said device comprises an enclosure (10) provided at its base with first communicating means and at its upper part with second means of communicating with the tank, said enclosure (10) containing, on the one head, an induction pipe (13) of a pump and on the other hand, a conduit (15) adapted to receive heated fluid ensuring the heating of the enclosure, characterized in that the enclosure (10) is resting on a dish member (11) at the bottom of the tank, in that the first communicating means is formed by vertical directional slots (12) situated at the base of said enclosure, in that the second means of communicating with the tank extends downwardly into the interior of said enclosure, said second means including a floating member (20) shiftable between sealing and unsealing positions of said second means in the filled and unfilled conditions respectively of said enclosure, and in that the induction pipe (13) comprises an end portion (13a) which is bent towards the top part of the enclosure and comprises a series of orifices 14 distributed throughout its length.

2. Device as claimed in claim 1, wherein the wall of the enclosure (10) is constituted by a heat-insulating material.

3. Device as claimed in claim 1, wherein said enclosure (10) is in the shape of a bell closed at its lower part and resting on said dish member, said dish member defining the low point of said tank.

4. Device as claimed in claim 1, wherein said conduit (15) comprises a continuous coil extending at least partly from the upper part to the lower part of said enclosure (15) and mounted on the inner wall of enclosure (10), said coil being provided at its base with a series of calibrated directional holes (15a) positioned to create a gyratory flow inside said enclosure (10).

5. Device as claimed in claim 1, wherein said second means is constituted by a hollow body (17) provided at its base with slots (18,19) issuing into the enclosure (10) as well as with an opening (22) at its upper part which opening issues into the tank (8) the combination including a float (20) situated in the hollow body (17) and positioned to block said opening in the full condition of said enclosure.

6. Device as claimed in claim 5, wherein said slots 19 in said hollow body are, orientted tangentially to thereby create a revolving flow inside the enclosure (10).

7. Device as claimed in claim 1, wherein said vertical directional slots (12) are oriented tangentially and are inclined upwardly from said tank into said enclosure.

8. Device as claimed in claim 1, wherein the inner surface of said enclosure (10) is provided with heat exchange means.

9. Device as claimed in claim 1, and including a heat regulator means (23) in said conduit (15) for selectively directing the warming-up fluid into the coil element of the enclosure (10) and into the tank (8) in relation to the temperature of the fluid passing through said induction pipe.

10. Fluid induction device, fitted inside a tank for drawing in liquid fuels in particular, wherein said device comprises an enclosure resting on a tray, said enclosure being provided at its base with vertical directional slots communicating with the tank, and at its upper part with a member adapted to connect the enclosure with the tank, said enclosure containing on the one hand an induction pipe with an end portion which is bent toward the upper part of the enclosure and comprising a series of orifices distributed over its length, and on the other hand a fluid return pipe ensuring the warming up of the enclosure, said fluid return pipe comprising conduits extending at least partly from the upper part to the lower part of said enclosure and mounted on the inner wall of the enclosure, said conduits being provided at their base with a series of calibrated directional holes creating a gyratory flow inside said enclosure.

* * * * *